United States Patent
Makino et al.

(10) Patent No.: US 7,421,302 B2
(45) Date of Patent: Sep. 2, 2008

(54) AUTOMOTIVE ELECTRONIC CONTROL SYSTEM INCLUDING COMMUNICABLY CONNECTED COMMANDING UNIT AND DRIVING UNIT

(75) Inventors: Nobuhiko Makino, Anjo (JP); Hideki Kabune, Nagoya (JP)

(73) Assignee: DENSO CORPORATION, Kariya (JP)

( * ) Notice: Subject to any disclaimer, the term of this patent is extended or adjusted under 35 U.S.C. 154(b) by 226 days.

(21) Appl. No.: 11/078,959

(22) Filed: Mar. 11, 2005

(65) Prior Publication Data

US 2005/0203646 A1  Sep. 15, 2005

(30) Foreign Application Priority Data

Mar. 12, 2004 (JP) ............... 2004-070991

(51) Int. Cl.
*G05B 19/18* (2006.01)
*G06F 11/00* (2006.01)

(52) U.S. Cl. ................. 700/9; 714/48; 714/49

(58) Field of Classification Search ......... 700/3, 700/9, 12, 21, 26, 27, 78, 79, 80, 91; 714/48
See application file for complete search history.

(56) References Cited

U.S. PATENT DOCUMENTS

| | | | | |
|---|---|---|---|---|
| 4,567,413 A | * | 1/1986 | Yabe et al. | 318/489 |
| 4,763,745 A | * | 8/1988 | Eto et al. | 180/422 |
| 4,803,613 A | * | 2/1989 | Kametani et al. | 700/3 |
| 5,053,964 A | * | 10/1991 | Mister et al. | 701/19 |
| 5,216,938 A | * | 6/1993 | Yamaguchi | 477/107 |
| 5,440,487 A | | 8/1995 | Althoff et al. | |
| 5,493,495 A | | 2/1996 | Naito et al. | |
| 5,682,314 A | * | 10/1997 | Nishino et al. | 701/29 |
| 5,833,325 A | * | 11/1998 | Hart | 303/7 |
| 6,006,166 A | * | 12/1999 | Meyer | 702/119 |
| 6,115,831 A | | 9/2000 | Hanf et al. | |
| 6,125,322 A | | 9/2000 | Bischof et al. | |
| 6,275,165 B1 | * | 8/2001 | Bezos | 340/3.44 |
| 6,341,239 B1 | * | 1/2002 | Hayashi et al. | 700/79 |
| 6,496,900 B1 | * | 12/2002 | McDonald et al. | 711/112 |
| 6,550,057 B1 | * | 4/2003 | Bowman-Amuah | 717/126 |
| 6,792,321 B2 | * | 9/2004 | Sepe, Jr. | 700/65 |
| 6,832,343 B2 | * | 12/2004 | Rupp et al. | 714/47 |

(Continued)

FOREIGN PATENT DOCUMENTS

| | | |
|---|---|---|
| EP | 1 362 765 | 11/2003 |
| EP | 1 369 287 | 12/2003 |
| JP | 56-03379 | 4/1981 |
| JP | 56-033739 | 4/1981 |
| JP | 2002-250250 | 9/2002 |
| WO | WO 98/36956 | 8/1998 |

*Primary Examiner*—Thomas K Pham
(74) *Attorney, Agent, or Firm*—Harness, Dickey & Pierce, PLC

(57) ABSTRACT

An electronic control system mounted on an automobile, such as a motor-assisted power steering system, includes a commanding unit for calculating a command value and a driving unit for driving an actuator according to the command value. The commanding unit and the driving unit are communicably connected to each other through a communication bus. The command value is calculated in response to an order to calculate sent from the driving unit and is transmitted to the driving unit. The driving unit detects abnormality or malfunction in the commanding unit by comparing the transmitted command value with data pre-stored in the driving unit. If a command value sent from one of the commanding units is found to be incorrect, the actuator is driven without using the incorrect command value.

6 Claims, 5 Drawing Sheets

U.S. PATENT DOCUMENTS

| | | |
|---|---|---|
| 6,839,597 B2 * | 1/2005 | Hattori et al. .................. 700/27 |
| 7,197,669 B2 * | 3/2007 | Kong et al. .................... 714/39 |
| 2002/0124212 A1 | 9/2002 | Nitschke et al. |
| 2004/0127997 A1 * | 7/2004 | Tajika ......................... 700/12 |
| 2004/0172580 A1 | 9/2004 | Kabune et al. |
| 2004/0181296 A1 * | 9/2004 | Muneta et al. ................ 700/21 |

* cited by examiner

AUTOMOTIVE ELECTRONIC CONTROL SYSTEM INCLUDING COMMUNICABLY CONNECTED COMMANDING UNIT AND DRIVING UNIT

CROSS-REFERENCE TO RELATED APPLICATION

This application is based upon and claims benefit of priority of Japanese Patent Application No. 2004-70991 filed on Mar. 12, 2004, the content of which is incorporated herein by reference.

BACKGROUND OF THE INVENTION

1. Field of the Invention

The present invention relates to an automotive electronic control system that includes a commanding unit and a driving unit, both communicably connected to each other, and more particularly to such a system having a capability of detecting abnormality or malfunction in the commanding unit.

2. Description of Related Art

An example of a so-called Lan-Pulse system for detecting abnormality or malfunction in an electronic control unit is disclosed in JP-B2-58-55535. This system includes: a microcomputer for outputting signals for controlling loads, a watchdog circuit for detecting abnormality in the microcomputer and for outputting a reset signal; a fail-safe circuit for outputting a fail-safe signal in response to the reset signal; and a switching circuit for switching control signals of the microcomputer to a fail-safe side in response to the fail-safe signal. A signal synchronized with a machine cycle of the microcomputer, when a computer program is executed, is generated. It is determined that abnormality is involved in the microcomputer if the synchronized signal is not generated.

In the so-called Lan-Pulse system, however, there is a possibility that abnormality of the calculating function in the microcomputer may not be detected although an excursion of the microcomputer is usually found. If the computing malfunction or abnormality is not detected, actuators may be driven using the abnormally calculated value. To solve this problem, a method for detecting such abnormality with a plurality of microcomputers has been proposed. This method, however, makes the system expensive.

Further, if the Lan-Pulse system is used in a network in which plural electronic control units cooperate with one another, the Lan-Pulse has to be continuously outputted. Therefore, traffic in a communication bus is congested, and data may collide with one another and communication speed may be decreased. Accordingly, it is difficult to transmit the Lan-Pulse through the common bus, and a communication line exclusive for the Lan-Pulse has to be provided. This makes the system expensive.

SUMMARY OF THE INVENTION

The present invention has been made in view of the above-mentioned problem, and an object of the present invention is to provide an improved electronic control system including plural microcomputers in a network, in which abnormality or malfunction of the microcomputers is surly detected without increasing a cost of the system.

The electronic control system mounted on an automobile vehicle includes at least one commanding unit for calculating a command value based on electrical signals and at least one driving unit for driving an actuator according to the command value sent from the commanding unit. The commanding unit and the driving unit are communicably connected to each other through a communication bus. The driving unit transmits an order to calculate the command value to the commanding unit, and the commanding unit calculates the command value in response to the order to calculate. The calculated command value is transmitted to the driving unit, and the driving unit detects abnormality or malfunction in the commanding unit based on the command value received. The abnormality is detected by comparing the command value with data stored in the driving unit.

The abnormality detection may be performed periodically at a predetermined interval. In a system where plural commanding units are connected, the abnormality detection in each commanding unit may be performed in a time-sharing method. The order and the interval of sending the order to calculate to plural commanding units may be variously set according to operating conditions of the driving unit in order to obtain the command value timely from each commanding unit. The detection of the abnormality in the commanding unit is performed before the actuator is driven to avoid the actuator from being driven based on an incorrect command value. When one command value is found to be incorrect, the actuator may be driven based on other correct command values without using the incorrect command value. The electronic control system according to the present invention is advantageously applicable to a motor-assisted power steering system. In this system, the driving unit is an electronic control unit for driving an electric motor assisting a steering torque.

According to the present invention, the abnormality or malfunction in the commanding unit is surely detected without using any additional communication line or device for detecting the abnormality. The electronic control system, therefore, can be manufactured at a low cost. Other objects and features of the present invention will become more readily apparent from a better understanding of the preferred embodiment described below with reference to the following drawings.

DETAILED DESCRIPTION OF THE PREFERRED EMBODIMENT

Figure 1:
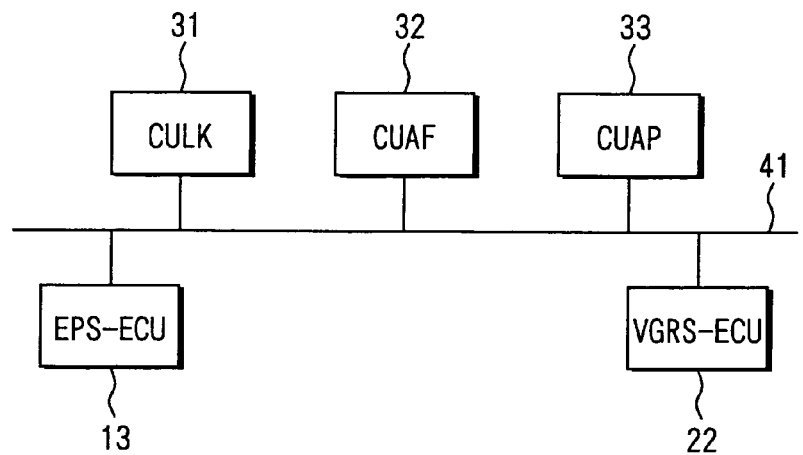
FIG. 1 is a block diagram showing an entire structure of an electronic control system.

A preferred embodiment of the present invention will be described with reference to accompanying drawings. FIG. 1 shows an electronic control system for use in an automotive vehicle. The system includes three commanding units, i.e., a commanding unit 31 for lane-keeping (referred to as CULK), a commanding unit 32 for automatically following a front vehicle (referred to as CUAF), and a commanding unit 33 for automatic parking (referred to as CUAP). The system also includes two driving units, i.e., a driving unit 13 for driving an assisting motor (referred to as EPS-ECU, or Electronic Control Unit for Electric Power Steering), and a driving unit 22 for changing a steering gear ratio (referred to as VGRS-ECU, or Electronic Control Unit for Variable Gear Ratio Steering). The commanding units 31, 32, 33 and the driving units 13, 22 are all connected to a common communication bus 41 so that these units are communicable with one another.

A front-watching camera 11 (shown in FIG. 3) is connected to the CULK 31, and the CULK 31 performs calculation necessary for keeping a present lane on which the vehicle is driving based on image information sent from the front-watching camera 11. Results of the calculation are transmitted to the EPS-ECU 13 or the VGRS-ECU 22 as a command value. A front watching radar 12 (shown in FIG. 3) is connected to the CUAF 32, and the CUAF 32 performs calculation necessary for keeping a distance between a front vehicle and the own vehicle based on information sent from the front-watching radar 12. Results of the calculation are transmitted to the commanding units 13, 22 as a command value. The information sent from the front-watching radar 12 includes a present distance between two vehicles and a driving speed of the front vehicle.

Similarly, a rear-watching camera (not shown) is connected to the CUAP 33, and the CUAP 33 performs calculation necessary for parking the vehicle at an intended position based on image information sent from the rear-watching camera. Results of the calculation is transmitted to the driving units 13, 22 as a command value. The EPS-ECU 13 or the VGRS-ECU 22 controls steering operation based the command values sent from the commanding units 31, 32, 33 and sends back to the commanding units 31, 32, 33 data indicating present conditions of the controls.

Figure 3:
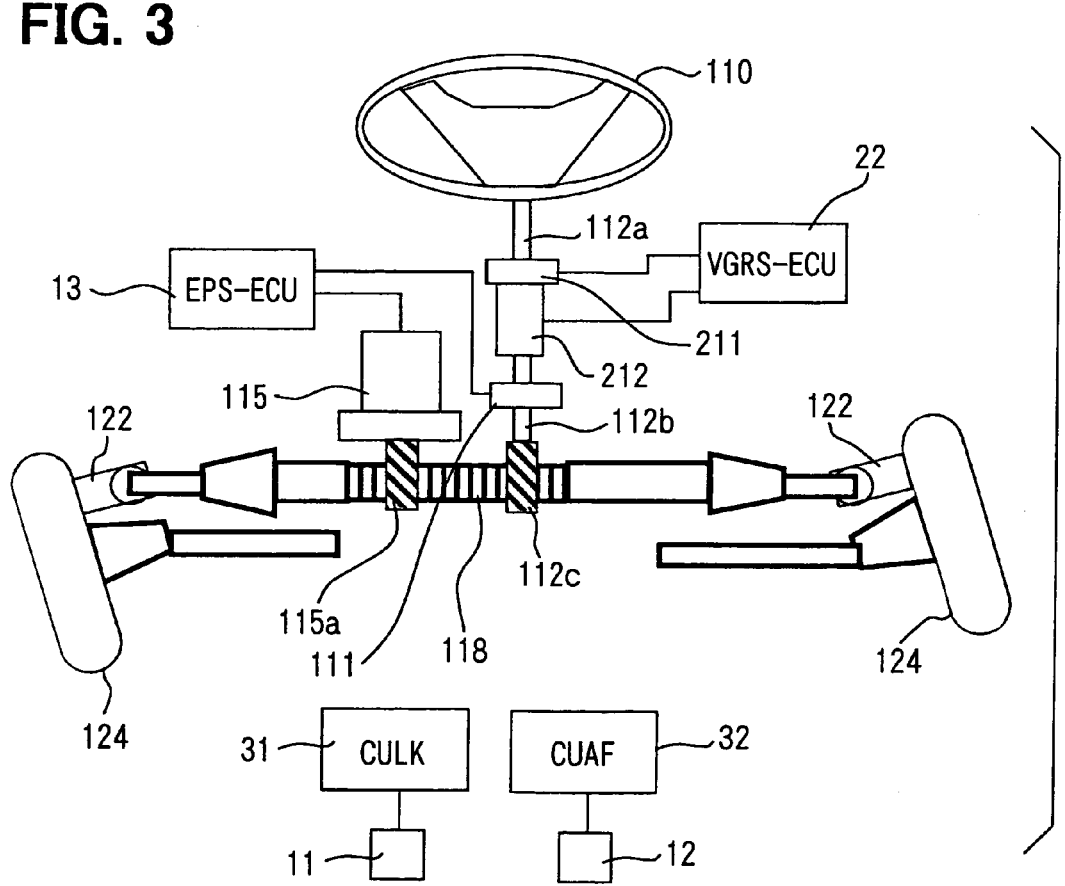
FIG. 3 is a schematic diagram showing an electric-power-assisted steering system mounted on an automotive vehicle, as an example of the electronic control system of the present invention.

In FIG. 3, a motor-assisted power steering system and a steering gear ratio changing system are shown. The commanding unit 33 shown in FIG. 1 is not shown here though other commanding units 31, 32 are shown. First, the motor-assisted power steering system will be described. A steering shaft 112a is connected to a steering wheel 110, and a pinion shaft 112b is connected to a pinion 112c. A steering angle sensor 211 is disposed between the steering shaft 112a and the pinion shaft 112b. A torque sensor 111 for detecting a steering torque is connected to the pinion shaft 112b. A pinion 112c is connected to the pinion shaft 112b and engages with a rack bar 118. At both ends of the rack bar 118, a pair of vehicle wheels 124 to be steered are connected via knuckle arms 122. An EPS actuator 115 (a power-assisting motor) is connected to the rack bar 118 via a pinion 115a. Alternatively, the EPS actuator 115 may be coaxially connected to the rack bar 118.

The torque sensor 111 and the EPS actuator 115 are electrically connected to the EPS-ECU 13. The EPS-ECU 13 is a known type of an electronic control unit constituted by a microcomputer 13a (shown in FIG. 4) that includes a CPU, a RAM, a ROM and an I/O (an input/output interface). The EPS-ECU 13 calculates an amount of current to be supplied to the EPS actuator 115 under an EPS control program stored therein based on command values transmitted from the commanding units. More particularly, the amount of current to be supplied to the EPS actuator 115 is calculated based on a steering torque of the steering shaft 112a, which is detected by the torque sensor 111. The EPS actuator 115 is driven to assist the steering torque of the steering shaft 112a.

Now, the steering gear ratio changing system will be explained. A steering angle sensor 211 and a VGRS actuator 212 are connected to the steering shaft 112a. The VGRS-ECU 22 is electrically connected to the steering angle sensor 211 and to the VGRS actuator 212. The VGRS-ECU 22 is a known type of an electronic control unit constituted by a microcomputer that includes a CPU, a RAM, a ROM and an I/O (an input/output interface).

The VGRS-ECU 22 calculates a steering angle to be generated in the VGRS actuator 212 under a VGRS control program stored therein based on command values transmitted from the commanding units. More particularly, the amount of current to be supplied to the VGRS actuator 212 is calculated based on a steering angle detected by the steering angle sensor 211. The VGRS actuator 212 is driven to change a relative angle between the steering shaft 112a and the pinion shaft 112b.

A process of detecting abnormality in the commanding units will be explained, taking as an example the motor-assisted power steering system including the driving unit EPS-ECU 13 and the commanding units 31, 32 and 33. Since an abnormality-detecting process in the steering gear ratio changing system is similar to that of the motor-assisted power steering system, it will not be explained here. The similar detecting process may be applied to other systems such as an anti-lock braking system, an anti-skid system or an active rear wheel steering system (4WS).

Figure 2:
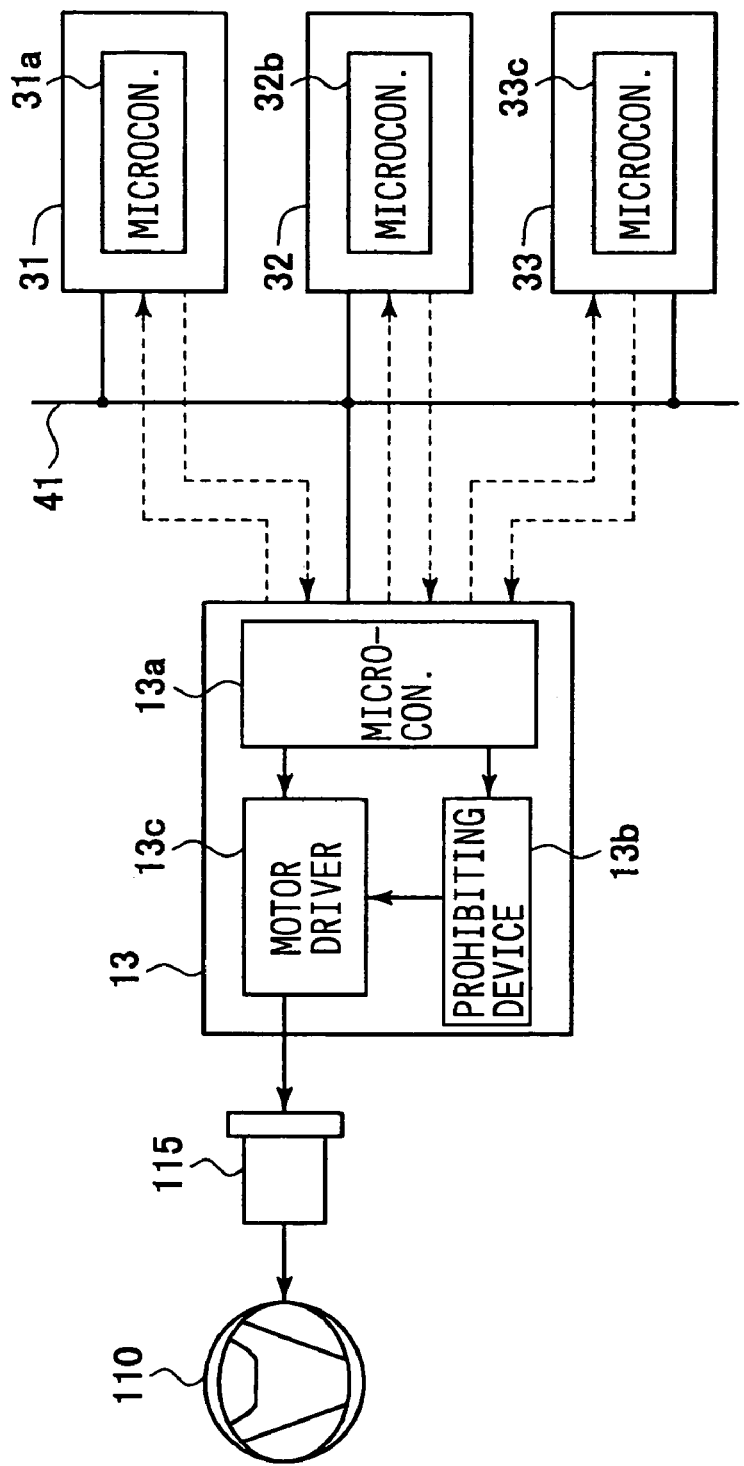
FIG. 2 is a block diagram showing flows of commands and orders in the electronic control system.

FIG. 2 shows flows of information (including orders to calculate and command values) in the motor-assisted power steering system. An order to calculate a command value is transmitted from a microcomputer 13a in the driving unit EPS-ECU 13 to a microcomputer 31a in the commanding unit CULK 31, to a microcomputer 32b in the commanding unit CUAF 32, and to a microcomputer 33c in the commanding unit CUAP 33. Each microcomputer 31a, 32b, 33c calculates a command value in response to the order to calculate transmitted from the EPS-ECU 13 and sends back to the EPS-ECU 13 a result value of calculation, i.e., a command value. The EPS-ECU 13 makes a judgment as to whether the result value is correct or not with reference to data stored therein. If the result value is not correct, it is determined that the commanding unit 31, 32 or 33 that has transmitted the incorrect command value is abnormal or malfunctioning. The correct command values are sent to a motor driver 13c, while a prohibiting device 13b prevents the incorrect command value from being supplied to the motor driver 13c.

Order numbers and calculation parameters corresponding to the respective orders to calculate are stored in the driving unit EPS-ECU 13 to avoid traffic congestion in the communication bus 41 in the process of sending the orders to calculate. On the other hand, a calculation command corresponding to each order number sent form the driving unit EPS-ECU 31 is stored in each commanding unit 31, 32, 33. The EPS-ECU 13 detects abnormality in each commanding units 31, 32, 33 based on the command value transmitted from the commanding unit in response to the order to calculate.

Figure 5:
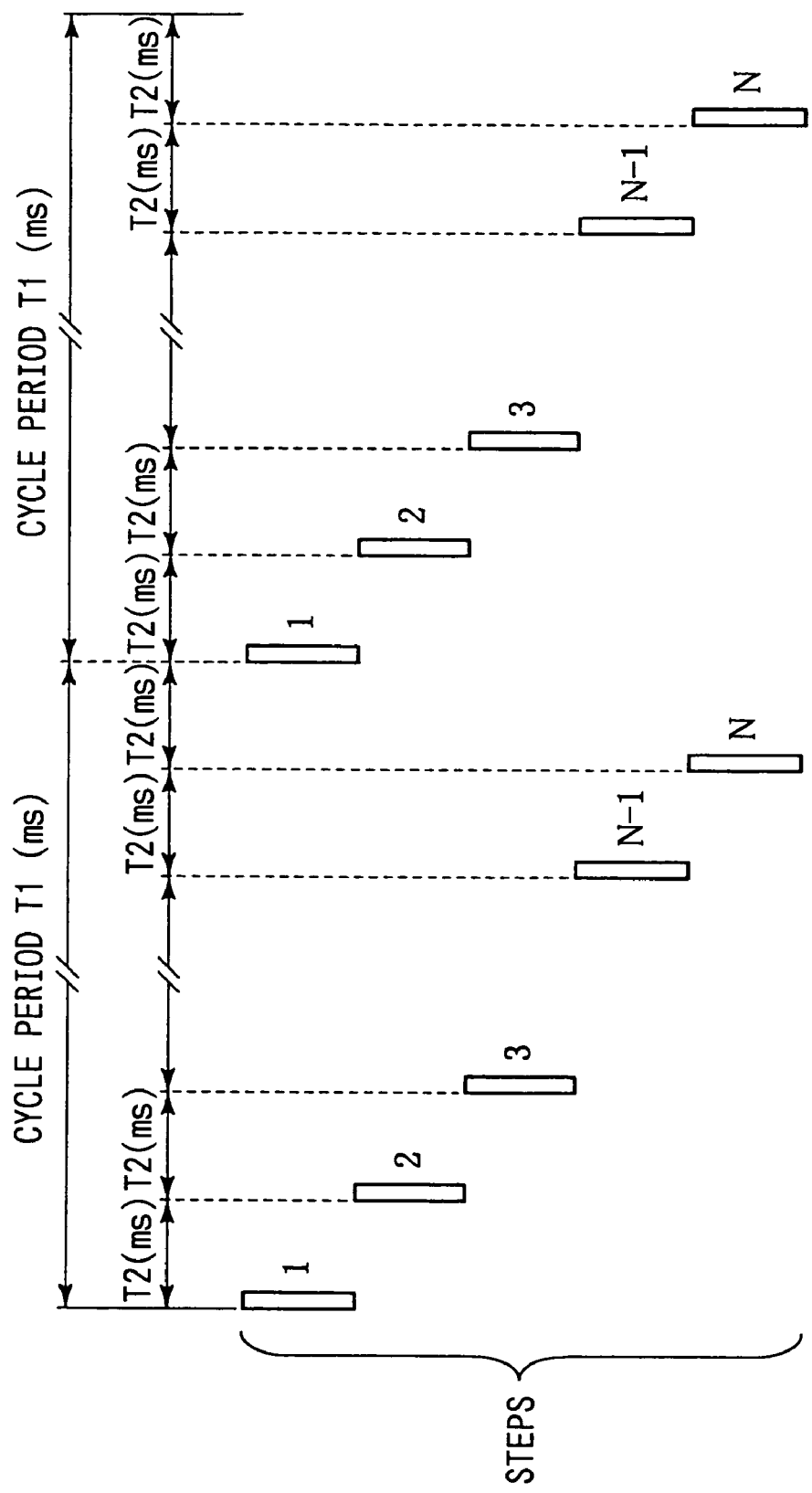
FIG. 5 is a timing chart showing timing of transmitting an order to calculate from a driving unit and timing of receiving a command value from a commanding unit.

FIG. 5 shows a timing chart of communication between the driving unit EPS-ECU 13 and the commanding units, i.e., CULK 31, CUAF 32 and CUAP 33. At step 1, the order to calculate is transmitted from the EPS-ECU 13 to the CULK 31. At step 2, the command value (results of calculation in response the order to calculate) is transmitted from the CULK 31 to the EPS-ECU 13, and the EPS-ECU 13 determines whether the command value is correct to thereby detect abnormality in the CULK 31. At the same step 2, the EPS-ECU 13 transmits the order to calculate to the CUAF 32. At step 3, the command value is transmitted from the CUAF 32 to the EPS-ECU 13, and the EPS-ECU 13 determines whether the command value is correct to thereby detect abnormality in the CUAF 32. At the same step 3, the EPS-ECU 13 transmits the order to calculate to the CUAP 33. At the next step 4 (not shown in FIG. 5), the command value is transmitted from the CUAP 33 to the EPS-ECU 13, and the EPS-ECU 13 determines whether the command value is correct to thereby detect abnormality in the CUAP 33. At the same step 4, the EPS-ECU 13 transmits the order to calculate to the CULK 31. These steps are repeated up to the last step N. At the last step N, however, the command value is received from the CUAP 33 but the order to calculate is not transmitted to the CULK 31.

Each step is performed in a period of T2 millisecond (ms), and one cycle from step 1 to step N is performed in a period of T1 millisecond (ms). Since the communication between the driving unit EPS-ECU 13 and the commanding units 31, 32, 33 are performed in a time-sharing manner as explained above, congestion in the communication bus 41 is surely avoided. The communication between the driving unit 13 and the commanding units 31, 32, 33 is performed in a cyclic manner as explained above. It is also possible to change the order or the number of times for performing the communication between the driving unit 13 and the respective commanding units 31, 32, 33 according to driving conditions of the vehicle, such as a vehicle speed or an amount of a steering angle. For example, the number of steps N in one cycle time T1 (ms) may be changed, or the order to calculate may be sent to the commanding unit CULK 31 at each odd numbered step and to the commanding units CUAF 32 and CUAP 33 at each even numbered step. The cycle period T1 (ms) has to be set so that the driving unit EPS-ECU 13 is not driven by an abnormal command value sent from the commanding units 31 32, 33. The command value sent from the commanding unit CULK 31 has to be checked before the EPS actuator 115 is driven by that command value.

Figure 4:
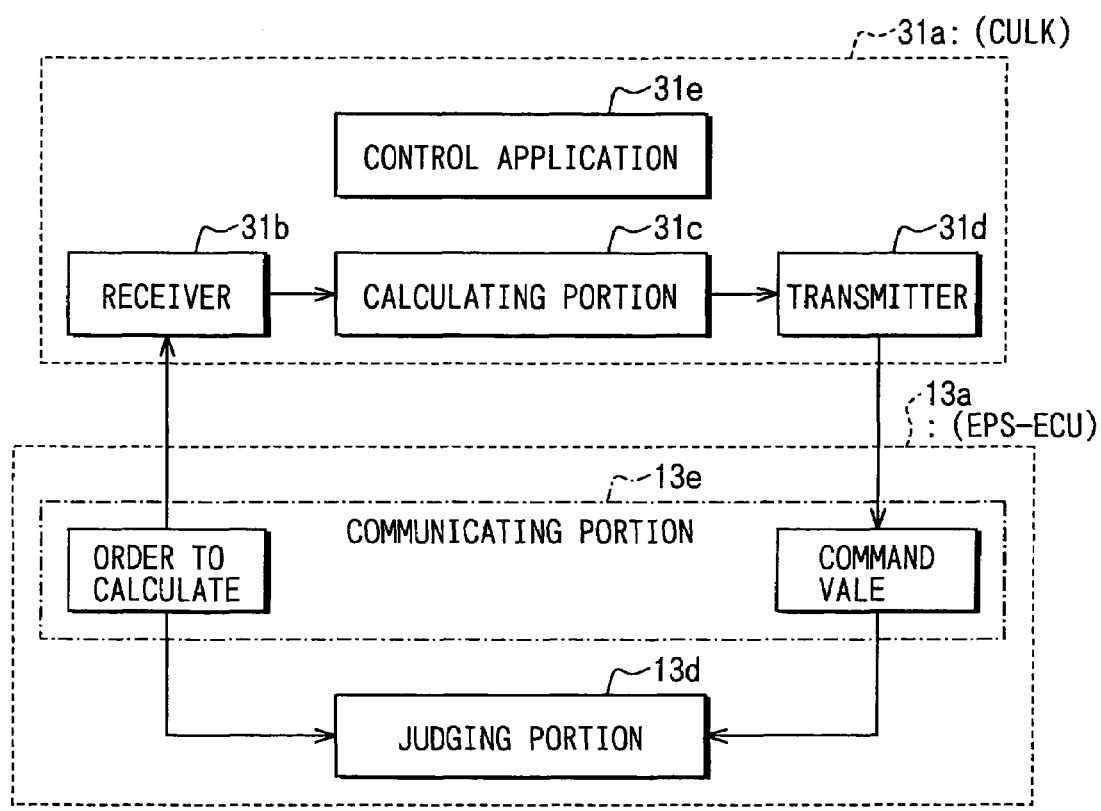
FIG. 4 is a block diagram showing a signal flow between a microcomputer in a commanding unit for lane-keeping and a microcomputer in a driving unit for driving an assisting motor.
Figure 6:
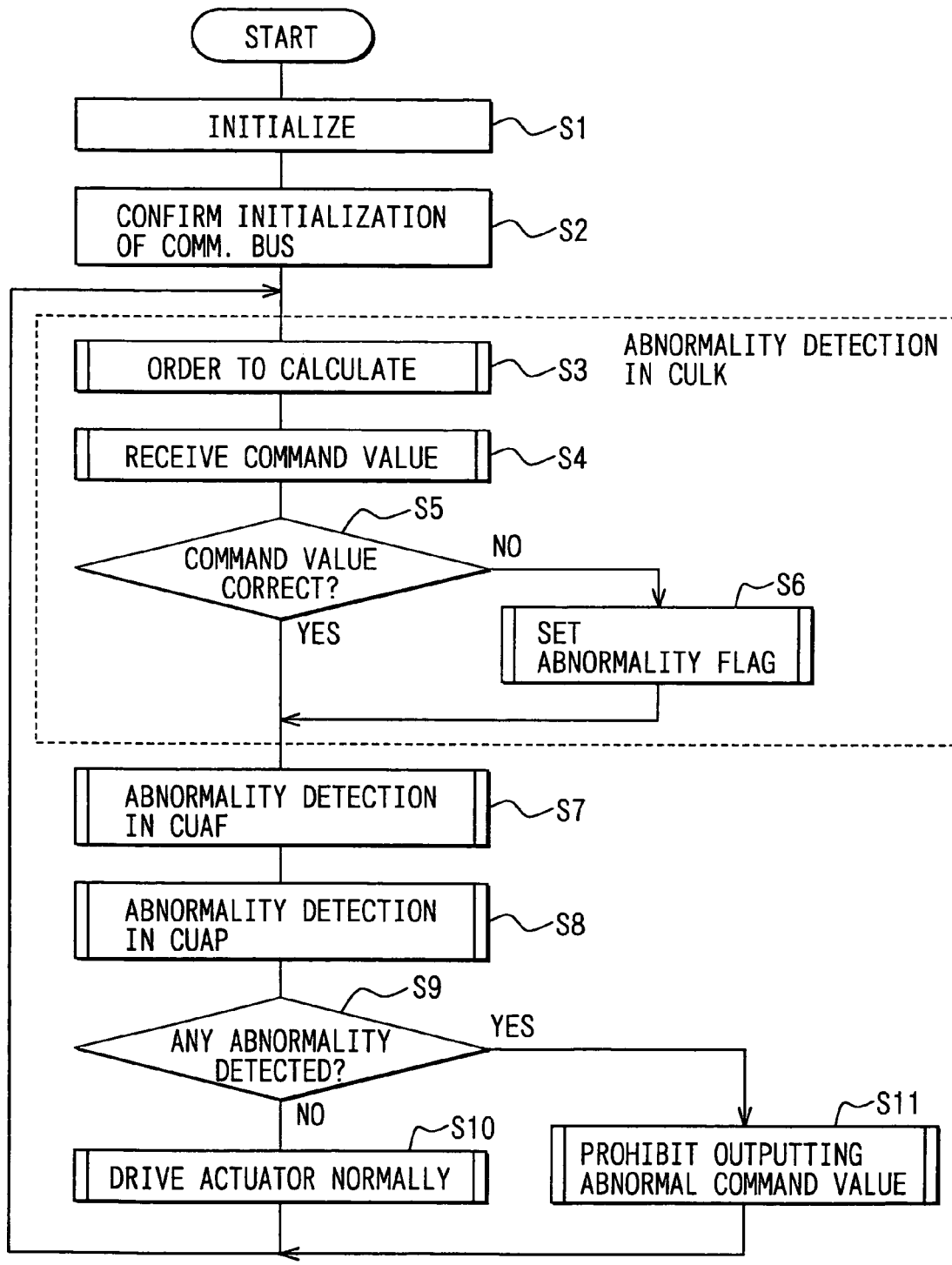
FIG. 6 is a flowchart showing a process of detecting abnormality in a commanding unit.

A process of detecting abnormality in the commanding units will be further explained with reference to FIG. 4 showing communication flows in the system and FIG. 6 showing a process flowchart. As shown in FIG. 4, the microcomputer 31a in the commanding unit CULK 31 includes a receiver 31b, a calculating portion 31c, a transmitter 31d and a control application 31e installed therein. The microcomputer 13a in the driving unit EPS-ECU 13 includes a judging portion 13d and a communicating portion 13e. The order to calculate is sent from the communicating portion 13e to the receiver 31b and to the judging portion 13d, and the calculating portion 31c calculates the command value in response to the order to calculate. The transmitter 31d sends out the command value to the communicating portion 13e, and the judging portion 13d of the microcomputer 13a determines whether the command value is correct or not.

Now, referring to FIG. 6, the process of detecting abnormality in the commanding units will be explained. At step S1, upon starting operation of the EPS-ECU 13, the EPS-ECU 13 is initialized. At step S2, an initializing signal is sent to the communication bus 41, and commanding units 31, 32, 33 responding to the initializing signal are recognized. Then, abnormality in the commanding unit CULK 31 is detected at the next steps S3-S6. At step S3, an order to calculate a command value is sent from the driving unit EPS-ECU 13 to the commanding unit CULK 31. At step S4, the CULK 31 calculates the command value in response to the order to calculate and sends back the command value to the EPS-ECU 13. The EPS-ECU 13 receives the command value at step S4 and judges whether the command value is correct at step 5. If the command value is correct, the process directly proceeds to step S7. If not, the process proceeds to step S7 after setting a flag showing abnormality in the commanding unit CULK 31 at step S6.

Abnormality in the commanding unit CUAF 32 and the commanding unit CUAP 33 is detected at step S7 and step S8, respectively, in the same manner as done in the steps S3-S6 for the commanding unit CULK 31. Then, the process proceeds to step S9. At step S9, it is determined whether abnormality is involved in any one of the commanding units 31, 32, 33. If no abnormality is detected in all of the commanding units 31, 32, 33, the process proceeds to step S10, where the EPS actuator 115 is normally driven according to the command values sent from the commanding units 31, 32, 33. If abnormality is detected in any one of the commanding units 31, 32, 33, the process proceeds to step S11, where the EPS actuator 115 is driven without using the command value sent from the commanding unit involving the abnormality. If the command values sent from all of the commanding units 31, 32, 33 are not correct, the EPS-ECU 13 drives the EPS actuator 115 according to a steering torque detected by the independent torque sensor 111.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An electronic control system for use in an automobile vehicle comprising:
 at least one commanding unit including means for calculating a command value based on electrical signals supplied thereto; and
 at least one driving unit for driving an actuator according to the command value received from the commanding unit, the driving unit being communicably connected to the commanding unit, wherein:
 the driving unit transmits an order to calculate the command value to the commanding unit;
 the commanding unit sends back a result value calculated in response to the order to calculate to the driving unit; and
 the driving unit detects abnormality in the commanding unit based on a comparison between the result value sent back from the commanding unit and data stored in and expected by the driving unit.

2. The electronic control system as in claim 1, wherein:
 the abnormality in the commanding unit is periodically detected at a predetermined interval.

3. The electronic control system as in claim 1, wherein:
 the abnormality in the commanding unit is detected based on the command value before the driving unit drives the actuator according to the command value.

4. The electronic control system as in claim 1, wherein:
 when the driving unit transmits the order to calculate to a plurality of the commanding units, an order and an interval of the transmission are set according to operating conditions of the driving unit.

5. The electronic control system as in claim 1, wherein:
 the driving unit is an electric power steering unit for driving an electric motor that assists a steering torque of a driver.

6. In an electronic control system for use in an automobile vehicle, the system including at least one commanding unit for calculating a command value based on electrical signals supplied thereto and at least one driving unit for driving an actuator according to the command value received from the commanding unit, the driving unit being communicably connected to the commanding unit, a method of detecting abnormality in the commanding unit, the method comprising:
 transmitting an order to calculate the command value from the driving unit to the commanding unit;
 calculating a result value in response to the order to calculate in the commanding unit;
 transmitting the result value from the commanding unit to the driving unit, and
 detecting abnormality in the commanding unit by comparing the result value transmitted from the commanding unit to the driving unit and data stored in and expected by the driving unit.

* * * * *